April 25, 1961
A. WARNICK
2,981,911
PRESSURE MEASURING APPARATUS
Filed Dec. 23, 1957
2 Sheets-Sheet 1
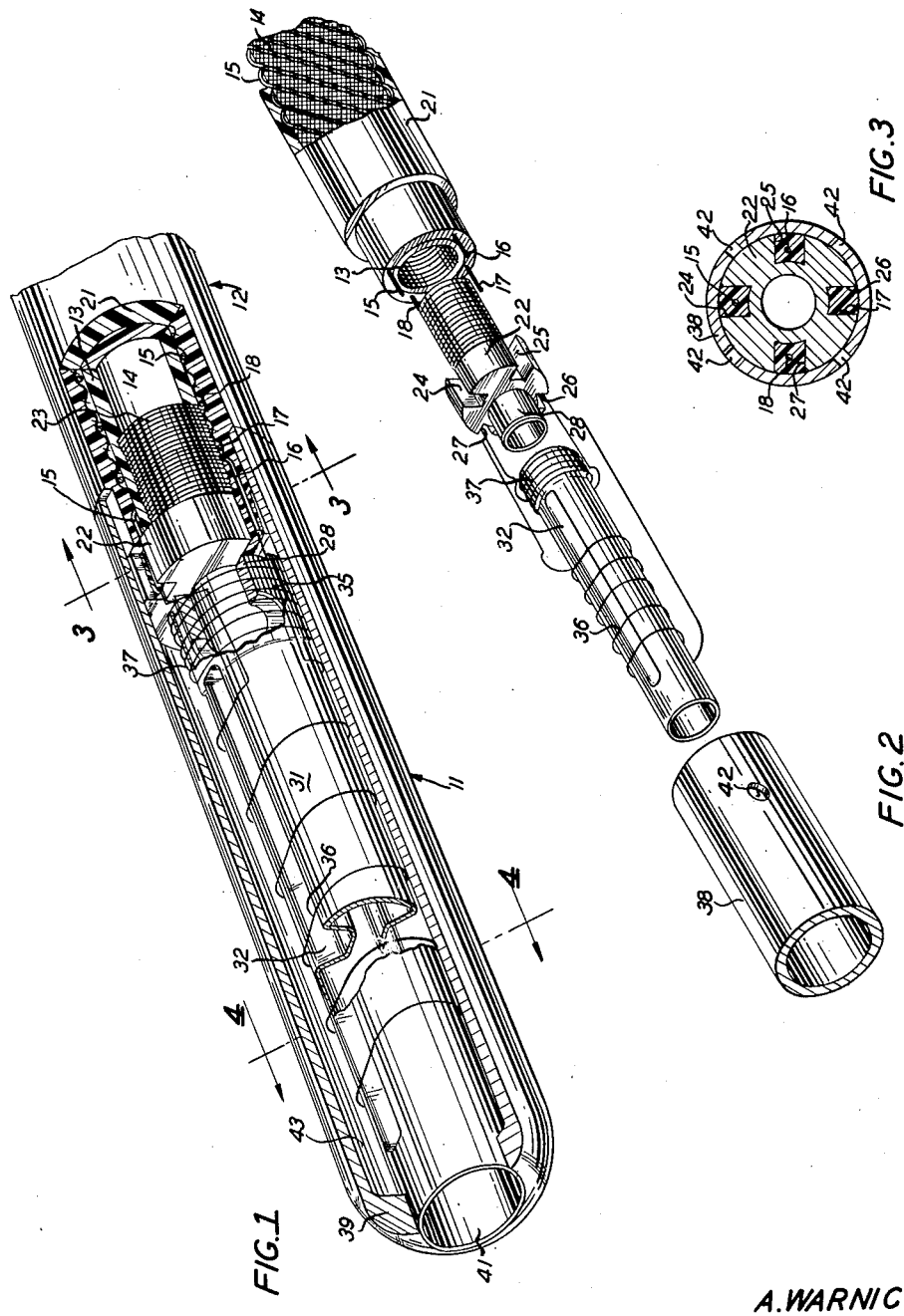
A. WARNICK
INVENTOR.
BY
ATTORNEYS April 25, 1961          A. WARNICK          2,981,911

PRESSURE MEASURING APPARATUS

Filed Dec. 23, 1957          2 Sheets-Sheet 2

A. WARNICK
INVENTOR.

BY E.C. McRae
J.R. Faulkner
D.H. Oster
H.L. Zerschling
ATTORNEYS

United States Patent Office 2,981,911
Patented Apr. 25, 1961

2,981,911

PRESSURE MEASURING APPARATUS

Alan Warnick, Oak Park, Mich., assignor to Ford Motor Company, Dearborn, Mich., a corporation of Delaware Filed Dec. 23, 1957, Ser. No. 704,671

2 Claims. (Cl. 338—4)

This inveniton relates to a pressure measuring apparatus and a pressure pickup and more particularly to a pressure measuring apparatus and pressure pickup capable of measuring the pressure of the blood in selected regions of the cardiovascular system.

The preferred embodiment of the present invention employs a pressure pickup capable of measuring the pressure of a fluid. The pickup has a hollow interior which communicates with the fluid, and includes electrical means for sensing the pressure of this fluid and for compensating for temperature variations. A catheter including a hollow tube is connected to the hollow interior of the pickup for drawing off a sample of the fluid. The catheter also includes a plurality of electrical conductors positioned along the hollow tube for connecting the pressure pickup with electronic circuitry which is capable of recording the fluid pressure sensed by the pickup.

The pressure measuring apparatus of the present invention is capable of being miniaturized to an extreme degree without materially affecting its reliability or sensitivity. When so miniaturized, it is particularly useful in measuring blood pressures in the internal regions of the heart and at other points in the cardiovascular system. Normally, the catheter with the pressure pickup attached thereto is inserted into the cardiovascular system through a large vein and manipulated into its desired position. The pressure of the blood at this desired position can then be accurately measured and a sample of the blood at that point can be taken through the pickup and the hollow tube of the catheter. Thus, a pressure measuring apparatus employing a catheter including a single tube with a pressure pickup attached thereto is provided which is capable of both sensing the pressure of the blood and of permitting a sample of the blood to be withdrawn for future study.

An object of the present invention is the provision of a pressure pickup for measuring fluid pressure.

Another object of the invention is to provide a reliable and sensitive pressure pickup for measuring fluid pressure which is capable of being miniaturized to an extreme degree.

A further object is the provision of a reliable and sensitive miniaturized pressure pickup which is capable of being inserted into the cardiovascular system of a human being for measuring blood pressure at different points in that system.

Still another object of the invention is the provision of a reliable and sensitive miniaturized pressure pickup for measuring blood pressure at different points in the cardiovascular system of human beings which permits blood sampling through a catheter attached thereto and which is capable of being readily sterilized.

Other object and attendant advantages of the present invention will become readily apparent as the specification is considered in connection with the accompanying drawings in which:

Figure 1 is a longitudinal view of the pressure pickup and catheter of the present invention partially in section;

Figure 2 is an exploded view of the pressure pickup and catheter of the present invention;

Figure 3 is a sectional view taken along the lines 3—3 of Figure 1;

Figure 4:
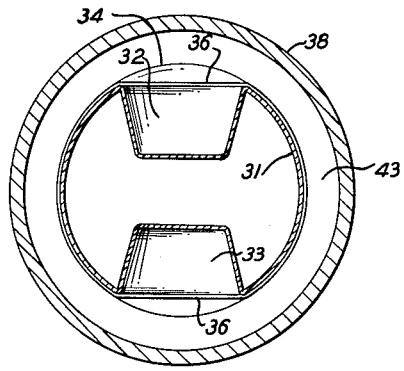
Figure 4 is a cross sectional view taken along the lines 4—4 of Figure 1.

Referring now to the drawings in which like reference numerals designate like parts throughout the several views thereof, there is shown in Figures 1 and 2, the pressure pickup of the present invention generally designated by the numeral 11 which is attached to a catheter generally designated by the numeral 12. The catheter comprises an internal tube 13 formed of nylon or other suitable material with a layer of nylon cord 14 and four insulated conductors 15, 16, 17 and 18 interwoven thereover. The outer wall 21 of the catheter is formed of a suitable plastic material placed over the internal tube 13, and the interwoven cord 14 and the conductors 15, 16, 17, and 18. This outer wall may be formed by dipping or spraying so that the interwoven cord and conductors are thoroughly impregnated by the plastic material.

A connector 22 having a threaded end portion 23 is threaded into the internal tube 13 of the catheter so that it is rigidly secured thereto. The connector also has a plurality of slots 24, 25, 26 and 27 positioned therein to permit passage of the conductors 15, 16, 17, and 18. An end section 28 of reduced diameter is provided on the connector to receive a longitudinal bellows 31.

The bellows 31 preferably has two longitudinal grooves 32 and 33 positioned therein which terminate in two end portions 34 and 35. Although two grooves are preferred, it is entirely feasible to construct the bellows with only one groove. This bellows may be formed by rolling sheet stock on a fluted mandrel and soldering the joined edges. For example, the bellows may be constructed from 0.0007 "Invar" sheet stock when a miniaturized pressure pickup is constructed.

A strain sensitive wire, for example, an alloy comprising 73% nickel, 20% chromium and the balance iron and aluminum is wound over the central portion of the bellows 31 to form a winding 36. A similar winding 37 is positioned over the end 35 of the bellows and preferably over that portion of the bellows which is supported by the end section 28 of connector 22. A cover 38 is placed over the bellows 31 and the windings 36 and 37, preferably in spaced coaxial relationship thereto. This cover is forced over a reduced end of the catheter wedging the nylon tubing 13 and a small length of the outer plastic wall 21 between the threaded end 23 of the connector and the cover. It will be noted that the cover has a portion 39 of reduced internal diameter adapted to receive the bellows 31. The cover is soldered to the bellows at this point. The cover preferably is constructed with a plurality of holes 42 positioned therein which fit over the connector 22 between the slots 24, 25, 26 and 27 and permit the cover to be soldered to the connector at these points (see Figure 3). A fluidtight connection is thus formed between the bellows and the cover at one end and the cover and the catheter at the other end thus permitting a selected reference pressure, for example, atmospheric pressure to be maintained in a fluidtight chamber 43 positioned between the bellows and the interior of the cover.

In certain applications, a capillary tube may be connected to the cover 38 to communicate with chamber 43 and any selected reference pressure may be maintained in the chamber 43 by connecting it to an external source of fluid pressure. The term selected reference pressure is meant to include the pressure exerted by a fluid sealed within the chamber 43 or a pressure exerted in the chamber by an external source.

A fluid, the pressure of which it is desired to measure, is admitted to the inside of the bellows 31 through the opening located in the end of the bellows and cover when the pressure pickup is immersed in the fluid. As can be seen by reference to Figure 4, this pressure acts on the entire inner surface of the bellows, however, the area on which the pressure acts is so proportioned that the force tending to expand the bellows is greater than that tending to contract it. Of course, the force tending to expand the bellows is resisted by the force exerted by the reference pressure existing in the chamber 43 and by the winding 36 which may be wound with a tension of 50,000 pounds per square inch. The actual force exerted by this winding may be small as the diameter of the wire may be on the order of 0.0005 inch when a pickup suitable for sensing intra-cardiac pressures is constructed. As the pressure inside the bellows increases, it is readily apparent that the width of that portion of the grooves 32 and 33 positioned along the outer periphery of the bellows 31 increases thereby increasing the length and resistance of the strain sensitive wire in the winding 36. Conversely, when the pressure inside the bellows decreases the width of the grooves 32 and 33 decreases under the influence of the reference pressure in the chamber 43 and the action of the winding 36. The length of the strain wire and hence its resistance is thereby reduced.

The winding 37 is placed over the end 35 of the bellows which is supported by end 28 of connector 22 so that it will not be affected by the pressure of the medium in the bellows 31. This winding utilizes the same wire as winding 36 and is wound under the same tension. The length of the two wires is made approximately equal and to equalize their resistances, the length of either winding may be shortened. The winding 37 is utilized to compensate for temperature changes within the pickup 11. This feature will become more apparent as the specification proceeds.

Figure 5:
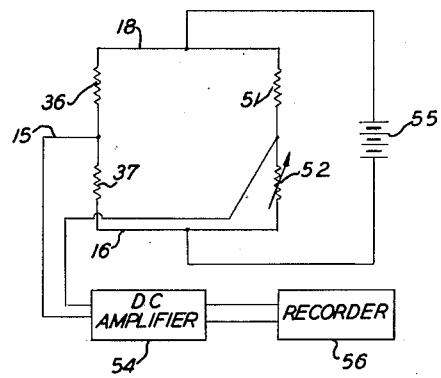
Figure 5 is a schematic of the electrical circuitry by means of which a usable electrical signal can be secured from the pressure pickup of Figure 1 and recorded; and, Figure 6 depicts one end of the catheter of the present invention.
Figure 6:
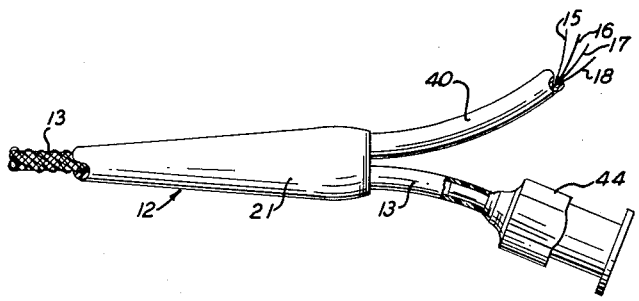

Referring now to Figure 5, it can be seen that the one end of each of the windings 36 and 37 is electrically connected to the conductor 15 while the other end of the winding 37 is connected to the conductor 16. The other end of the winding 36 is connected to the conductor 18. The conductor 17 is connected to the connector 22 on one wall of the slot 26 by soldering. The conductors 15, 16, and 18 are suitably spaced from the walls of the connector slots by an insulating varnish or plastic as can best be seen by reference to Figure 3. These four conductors are wound in spaced spiral relationship around the nylon tube 13 and interwoven with nylon thread 14 to maintain proper spacing of the conductors as can best be seen by reference to Figure 2. At the other end of the catheter, the four conductors 15, 16, 17, and 18 are brought out into a second tube 40 while the tube 13 continues and has a connector 44 attached thereto (see Figure 6). The connector 44 is adapted to receive a syringe or other suitable means for withdrawing a sample of the fluid present in the interior of bellows 31 through the tube 13.

In certain pressure measuring applications, it is apparent that the catheter 12 may not be necessary, for example, when measuring the pressure of a fluid in a system where a sample of the fluid is not necessary or is otherwise readily obtainable. In this case, or where an easily removable pickup is required, it is possible to shorten the cover 38 and solder it around its periphery to that portion of the connector containing the slots 24, 25, 26, and 27. A fluidtight seal between the cover 38 and the connector 22 is thus provided as the slots 24, 25, 26, and 27 are filled with plastic or varnish.

Referring now to Figure 5, there is shown a schematic of the electrical circuity employed to produce and record electrical signals which are a function of the pressure of the medium present in the bellows 31. This circuit is fundamentally a Wheatstone bridge with pressure pickup windings 36 and 37 forming two legs of the bridge, while resistor 51 and adjustable resistor 52 form the other two legs of the bridge. As pointed out previously, the values of resistances in the windings 36 and 37 are made equal by proper winding and adjustment of their lengths. The other two resistors 51 and 52 are preferably equal in resistance to the windings 36 and 37. The conductor 18 is connected to one end of the resistor 51 while the conductor 16 is connected to one end of the adjustable resistor 52. The conductor 15, which joins one end of the winding 36 with one end of the winding 37 is connected to suitable electronic equipment such as a D.C. amplifier 54. The D.C. amplifier is also connected to the point where the two resistors 51 and 52 join. A battery 55 furnishes the electrical current necessary to operate the bridge and furnish the electrical signals to the D.C. amplifier 54. The conductor 17, which is soldered to the connector 22, is suitably connected to the chassis of the D.C. amplifier 54 or the recorder 56. Since all of the metal parts of the pressure pickup are in electrical contact with the connector 22, and all of the other components are in electrical contact with each other, the connection of the conductor 17 to the chassis of one of the other components assures that the whole pressure measuring apparatus is at the same potential.

When the pressure pickup 11 is immersed in a fluid, for example, the blood, when it is inserted in the cardiovascular system, it is apparent that both the windings 36 and 37 are subjected to the temperature of this fluid. Thus, the resistances of both windings change in unison and by the same amount thereby keeping the potential drop across the resistor 37 the same regardless of the temperature present in the fluid to be measured.

Prior to use, the pressure measuring apparatus can be balanced and calibrated in a fluid environment having the same temperature as the fluid which is to be studied. If, for example, the pressure pickup is to be inserted in the cardiovascular system for studying blood pressure, the apparatus can be balanced and calibrated by immersing the pickup in a fluid which is at body temperature. After the pressure pickup 11 is immersed in a fluid medium; for example, the blood in the cardiovascular system, the tube 13 may be connected to a manometer and the average pressure in the fluid medium determined. This permits the scale on the recorder 56 to be expanded so that dynamic fluctuations in the pressure can be carefully studied.

As the pressure in the fluid present within the bellows 31 varies, the resistance of the winding 36 changes as a function of this pressure, while the winding 37 is unaffected thereby. This produces an unbalance of the bridge circuit causing a corresponding variation in voltage output from the bridge. This variation in potential is fed to the D.C. amplifier 54 which amplifies the signal to such an extent that it may be recorded by conventional recorder 56. Thus, a continuous record of the pressure present in a given fluid medium may be obtained.

Although not so limited, the following materials and dimensions may be used in constructing a pressure pickup suitable for use in securing intra-cardiac blood pressures:

The pickup may have an overall length of 0.65 inch with an outside diameter of 0.09 inch. The connector 22, bellows 31 and cover 38 may be constructed of Invar or other suitable alloys having low temperature coefficients. The strain wire comprising the windings 36 and 37 may be an alloy comprising 73% nickel, 20% chromium, with the balance of aluminum and iron. This wire may have a diameter of 0.0005 inch. The electrical conductors 15, 16, 17, and 18 may be formed of any suitable electrical conductor. The bellows 31 may be constructed of 0.0007 inch sheet stock. Constructing the bellows of Invar or other suitable alloy having a low temperature coefficient prevents the bellows from changing in diameter due to temperature. Such an expansion, if permitted, would, of course, produce a signal at the bridge caused by an increase in the length and resistance of the wire in the winding 36 without an attendant increase in the resistance in the winding 37.

It is, of course, possible that various other electrical methods may be used to sense the pressure in the bellows 31, for example, a change of inductance of a winding or windings about the central portion of the bellows may be employed to produce an electrical signal. Similarly, a change in capacitance between the outer portions of the bellows 31, a metal cylinder or cylinders insulated from the bellows and the cover may be employed to produce an electrical signal. However, due to the long lengths of lead wire required and the problems associated therewith in employing alternating current, the use of the strain sensitive resistance wire with direct current is preferred to give proper results when the pickup is employed to sense blood pressure in the cardiovascular system.

Thus, the present invention provides a sensitive and reliable pressure measuring apparatus which is particularly useful in measuring blood pressure at various positions in the cardiovascular system. As can readily be appreciated, a catheter employing a single tube is used both for withdrawing a sample of the fluid and for connecting the pressure pickup with associated electronic equipment. This feature is particularly important when the pressure measuring apparatus is employed in measuring the blood pressure at various positions in the cardiovascular system, since the diameter of the pressure pickup and the catheter can be made very small. This facilitates the insertion of the pickup and the catheter into the cardiovascular system and aids the manipulation of the pickup through this system.

The miniaturized pressure pickup and catheter is capable of being inserted into various other parts of the human body for studying the pressures present and for removing a sample of any fluid which it is desired to be studied. For example, the pressure pickup and catheter may be inserted into the stomach through the esophagus to study the pressures present in the stomach and for withdrawing a sample of the fluid present. The pressure measuring apparatus may also be used to study the pressures in any fluid medium and to withdraw a sample therefrom for further study.

It will be understood that the invention is not to be limited to the exact construction shown and described, but that various changes and modifications may be made without departing from the spirit and scope of the invention, as defined in the appended claims.

What is claimed is:

1. A pressure pickup for sensing the pressure in a fluid comprising, an all-metal imperforate thin wall hollow cylinder having end portions and a middle portion, the middle portion of the wall having a portion displaced inwardly to form a longitudinal inwardly extending groove thereby forming a grooved central portion and two ungrooved end portions, the wall and groove being so dimensioned and shaped as to permit measurable expansion of said middle portion in response to slight pressure variations within the cylinder, a connector having a central portion with a plurality of slots positioned therein, said connector having an end portion of reduced diameter, one of the ungrooved end portions of said all-metal hollow cylinder being fitted over said portion of reduced diameter, a cover positioned in spaced coaxial relationship with respect to the grooved portion of said all-metal hollow cylinder, said cover having an end portion of reduced internal diameter receiving the other of said ungrooved end portions of said all-metal hollow cylinder in a fluid tight relationship, the other end of said cover fitting over the central portion of said connector and being affixed thereto, said slots in the central portion of said connector being filled with an insulating material, a winding of strain sensitive resistance wire positioned under tension across the groove and around said hollow cylinder, one end of said strain sensitive resistance wire passing through the insulating material in one of said slots in the central portion of said connector and the other end of said strain sensitive resistance wire passing through the insulating material in another of said slots in the central portion of said connector.

2. A pressure pickup for sensing the pressure in a fluid comprising an all-metal imperforate thin wall hollow cylinder having end portions and a middle portion, the middle portion of the wall having portions displaced inwardly to form a pair of opposed longitudinally inwardly extending grooves thereby forming a grooved central portion and two ungrooved end portions, each of said grooves having a bottom wall, said bottom walls being disposed in substantially parallel relationship, the wall of said all-metal hollow cylinder and the grooves being so dimensioned and shaped as to permit measurable expansion of said middle portion in response to slight pressure variations within the all-metal hollow cylinder, a connector having a central portion with a plurality of slots positioned therein, said connector having an end portion of reduced diameter, one of the ungrooved end portions of said all-metal hollow cylinder being fitted over said portion of reduced diameter, a cover positioned in spaced coaxial relationship with respect to the grooved portion of said all-metal hollow cylinder, said cover having an end portion of reduced internal diameter receiving the other of said ungrooved end portions of said all-metal hollow cylinder in a fluid tight relationship, the other end of said cover fitting over the central portion of said connector and being affixed thereto, said slots in the central portion of said connector being filled with an insulating material, a winding of strain sensitive resistance wire positioned under tension across the grooves and around said all-metal hollow cylinder, one end of said strain sensitive resistance wire passing through the insulating material in one of said slots in the central portion of said connector and the other end of said strain sensitive resistance wire passing through the insulating material in another of said slots in the central portion of said connector.

References Cited in the file of this patent

UNITED STATES PATENTS

| | | |
|---|---|---|
| 2,634,721 | Greenwood | Apr. 14, 1953 |
| 2,735,949 | Podolsky | Feb. 21, 1956 |
| 2,769,929 | Hardway | Nov. 6, 1956 |